United States Patent
Liu

(10) Patent No.: US 12,411,591 B2
(45) Date of Patent: Sep. 9, 2025

(54) INFORMATION PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventor: Zhaoyi Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/871,359

(22) PCT Filed: Jun. 14, 2023

(86) PCT No.: PCT/CN2023/100117
§ 371 (c)(1),
(2) Date: Mar. 18, 2025

(87) PCT Pub. No.: WO2023/241609
PCT Pub. Date: Dec. 21, 2023

(65) Prior Publication Data
US 2025/0208753 A1     Jun. 26, 2025

(30) Foreign Application Priority Data
Jun. 15, 2022   (CN) .......................... 202210680320.0

(51) Int. Cl.
*G06F 3/0482* (2013.01)
*G06F 3/0484* (2022.01)
(52) U.S. Cl.
CPC .......... *G06F 3/0484* (2013.01); *G06F 3/0482* (2013.01)

(58) Field of Classification Search
CPC ................................................. G06F 3/048–05
See application file for complete search history.

(56) References Cited

U.S. PATENT DOCUMENTS

| 5,675,637 A | 10/1997 | Szlam et al. |
| 7,856,469 B2 * | 12/2010 | Chen ....................... H04L 51/04 715/752 |

(Continued)

FOREIGN PATENT DOCUMENTS

| CN | 107104880 A | 8/2017 |
| CN | 109799938 A | 5/2019 |

(Continued)

OTHER PUBLICATIONS

Notice of Allowance and Allowed Claims issued Mar. 22, 2024 in CN Appl. No. 202210680320.0, English translation (15 pages).

(Continued)

*Primary Examiner* — Daniel Rodriguez

(57) ABSTRACT

The present disclosure provides an information processing method and apparatus, an electronic device and a storage medium. The information processing method includes: tagging a first session, in response to a first operation event for the first session; or, tagging a first message, in response to a second operation event for the first message on a session interface; and displaying a first interface, in response to a third operation event for an interface entrance of the first interface; and displaying the first session, which is tagged, and the first message, which is tagged, on the first interface.

20 Claims, 13 Drawing Sheets

(56) References Cited

U.S. PATENT DOCUMENTS

| | | | | |
|---|---|---|---|---|
| 8,307,041 | B2 * | 11/2012 | Bhogal | G06Q 10/107 |
| | | | | 715/752 |
| 10,938,755 | B1 | 3/2021 | MacMillin et al. | |
| 2005/0222985 | A1 * | 10/2005 | Buchheit | G06F 3/0482 |
| 2007/0300169 | A1 | 12/2007 | Jones et al. | |
| 2009/0150397 | A1 * | 6/2009 | Chen | G06F 16/955 |
| | | | | 715/764 |
| 2009/0208001 | A1 * | 8/2009 | Kent, Jr. | H04L 63/0457 |
| | | | | 380/42 |
| 2010/0169793 | A1 * | 7/2010 | Solie | H04L 51/04 |
| | | | | 715/753 |
| 2012/0159349 | A1 * | 6/2012 | Kansky | G06F 3/0481 |
| | | | | 715/752 |
| 2014/0075333 | A1 * | 3/2014 | Taneja | G06Q 50/01 |
| | | | | 715/752 |
| 2014/0096032 | A1 * | 4/2014 | Mayblum | H04L 51/42 |
| | | | | 715/752 |
| 2014/0139555 | A1 * | 5/2014 | Levy | G10H 1/18 |
| | | | | 715/202 |
| 2014/0317502 | A1 * | 10/2014 | Brown | G10L 15/22 |
| | | | | 715/706 |
| 2018/0331996 | A1 | 11/2018 | Zhang et al. | |
| 2018/0367461 | A1 | 12/2018 | Xu | |
| 2020/0226481 | A1 * | 7/2020 | Sim | G06F 21/34 |
| 2021/0132749 | A1 * | 5/2021 | Delanghe | G06F 16/953 |
| 2022/0029841 | A1 * | 1/2022 | Zheng | H04L 12/189 |
| 2022/0182348 | A1 * | 6/2022 | Khosrowshahi | H04L 51/046 |
| 2022/0368658 | A1 * | 11/2022 | Soman | G06F 3/0484 |

FOREIGN PATENT DOCUMENTS

| | | |
|---|---|---|
| CN | 110401590 A | 11/2019 |
| CN | 112769679 A | 5/2021 |
| CN | 112947823 A | 6/2021 |
| CN | 113010254 A | 6/2021 |
| CN | 113300941 A | 8/2021 |
| CN | 113923175 A | 1/2022 |
| CN | 115103056 B | 4/2024 |
| JP | 2014096798 A | 5/2014 |
| JP | 2017033123 A | 2/2017 |
| JP | 2017515181 A | 6/2017 |
| JP | 2017517811 A | 6/2017 |
| JP | 2018506791 A | 3/2018 |
| KR | 2016-0150631 A | 12/2016 |
| WO | 2022/095969 A1 | 5/2022 |

OTHER PUBLICATIONS

Chao et al., "Research and Development of system login method based on mobile terminal", Computer Engineering & Software, vol. 38, No. 3, pp. 1-4.

Guannan, "Design and implementation of iOS client for enterprise instant messaging system", May 10, 2017, pp. 1-72.

International Search Report received for PCT Patent Application No. PCT/CN2023/100117, mailed on Sep. 15, 2023, 5 pages (2 pages of English Translation and 3 pages of Original Document).

Notification of registration procedures received from Chinese patent application No. 202210680320.0 mailed on Mar. 22, 2024, 6 pages (3 pages English Translation and 3 pages Original Copy).

Office action received from Chinese patent application No. 202210680320.0 mailed on Aug. 8, 2023, 17 pages (7 pages English Translation and 10 pages Original Copy).

Zhou, "An empirical investigation of deception behavior in instant messaging", IEEE, vol. 48, No. 2, May 31, 2005, pp. 147-160.

Notice of Refusal for Japanese Application No. 2024-570428, mailed May 13, 2025, 08 pages.

* cited by examiner

Fig. 12

INFORMATION PROCESSING METHOD AND APPARATUS, ELECTRONIC DEVICE, AND STORAGE MEDIUM

CROSS-REFERENCE TO RELATED APPLICATION

The present disclosure is a U.S. national stage application of International Patent Application No. PCT/CN2023/100117, filed on Jun. 14, 2023, which claims the priority to Chinese Patent Application No. 202210680320.0, filed on Jun. 15, 2022, which is incorporated herein by reference in its entirety as a part of the present application.

TECHNICAL FIELD

The present disclosure relates to a field of computer technology, and more particularly, to an information processing method and apparatus, an electronic device and a storage medium.

BACKGROUND

In a communication client, a user sends a message to and receives a message from other users; with respect to the message sent or received, the user may be interested in the message and collect the same to favorites, and then the user may view the message collected in a favorites folder.

SUMMARY

The present disclosure provides an information processing method and apparatus, an electronic device and a storage medium.

The present disclosure adopts technical solutions below.

At least one embodiment of the present disclosure provides an information processing method, comprising:
  tagging a first session, in response to a first operation event for the first session: or, tagging a first message, in response to a second operation event for the first message on a session interface; and
  displaying a first interface, in response to a third operation event for an interface entrance of the first interface; and displaying the first session, which is tagged, and the first message, which is tagged, on the first interface.

At least one embodiment of the present disclosure further provides an information processing apparatus, comprising:
  a tagging unit, configured to tag a first session, in response to a first operation event for the first session: or, tag a first message, in response to a second operation event for the first message on a session interface; and
  a control unit, configured to display a first interface, in response to a third operation event for an interface entrance of the first interface; and displaying the first session, which is tagged, and the first message, which is tagged, on the first interface.

At least one embodiment of the present disclosure further provides an electronic device, comprising: at least one memory and at least one processor;
  wherein the at least one memory is configured to store a program code; and the at least one processor is configured to call the program code stored in the at least one memory to execute the above method provided by any one of embodiments of the present disclosure.

At least one embodiment of the present disclosure further provides a non-transient computer-readable storage medium, configured to store a program code, wherein the program code, upon being executed by a processor, causes the processor to execute the above method provided by any one of embodiments of the present disclosure.

The information processing method provided by the embodiment of the present disclosure includes: storing tagged sessions and messages on a same first interface, so that a user may directly find all followed sessions and messages from the first interface without having to view the followed sessions and messages respectively from different entrances, which reduces a difficulty in use by the user and is more convenient to maintain.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

FIG. 2 to FIG. 12 are schematic diagrams of a display interface of a communication client according to an embodiment of the present disclosure.

DETAILED DESCRIPTION

Figure 1:
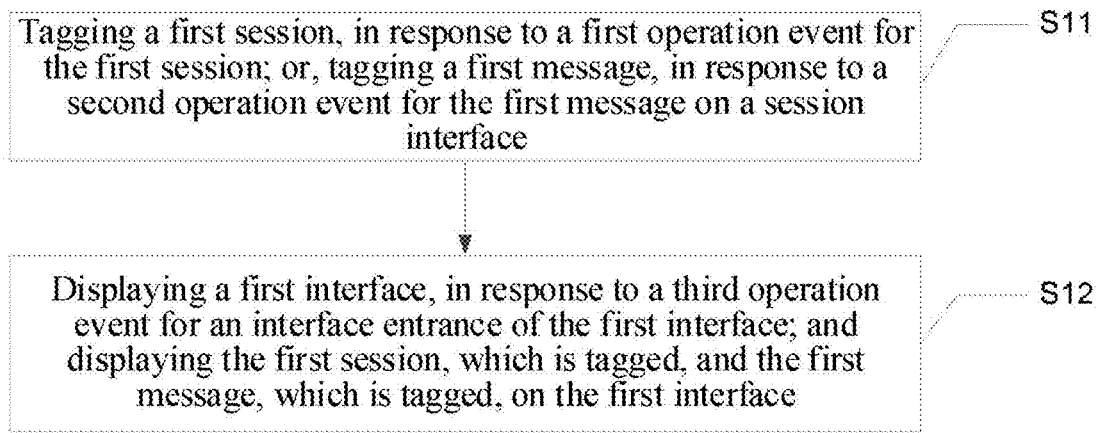
FIG. 1 is a flow chart of an information processing method according to an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment": the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

Names of messages or information interacted between a plurality of apparatuses according to the implementations of the present disclosure are only used for illustrative purposes, and are not used to limit the scope of these messages or information.

The solutions provided by the embodiments of the present disclosure will be described in detail below in conjunction with the accompanying drawings.

A communication client, for example, an instant communication client, is used to make sessions with and send messages to other users: when a user follows a session, the user may tag the session; and when a user follows a message, the user may collect the message to favorites. The user may view the tagged session on a tag page, and view the collected messages on a favorites page. The tag page and the favorites page have different entrances.

As shown in FIG. 1, FIG. 1 is a flow chart of an information processing method according to an embodiment of the present disclosure; and the method may be used in a client, for example, a communication client, and includes step S11 and step S12 as follows.

S11: tagging a first session, in response to a first operation event for the first session: or, tagging a first message, in response to a second operation event for the first message on a session interface.

Figure 2:
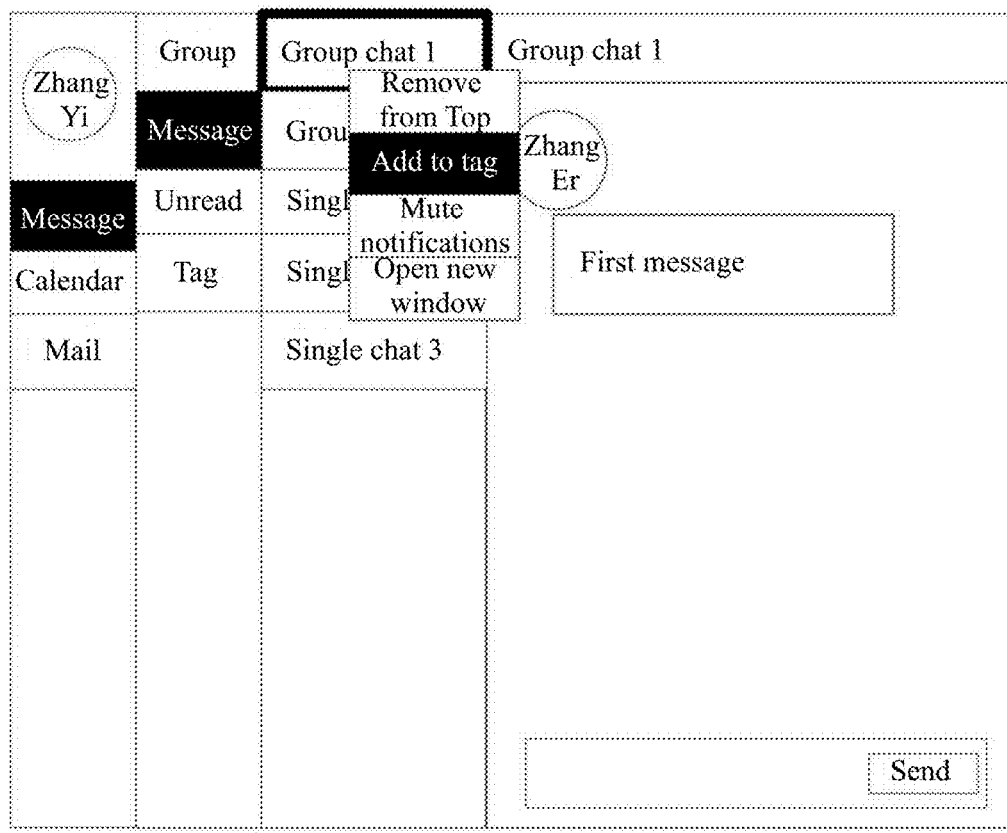

In some embodiments, the method proposed in the present disclosure may be used in a communication client, for example, an instant communication client: the first session may be a single chat session between a user and another user, or may also be a group chat session composed of a plurality of users: the first operation event and the second operation event may each independently include one or more operations: the first operation event or the second operation event, for example, may include triggering display of an option list by clicking a right mouse button, and then selecting a tag item in the option list. For example, as shown in FIG. 2, the first session (group chat 1) may be tagged after triggering a certain control used for tagging ("Add to tags" in FIG. 2) among option controls for the first session. In some embodiments, a display interface of the communication client may adopt the display interface shown in FIG. 2, or may also adopt the display interface shown in FIG. 3: the two display interfaces differ from each other in that in FIG. 2, sort operations such as "group", "message", "unread", "tag", etc., are displayed vertically, while in FIG. 3, "message", "unread", "tag", etc. are displayed horizontally: the display interface in FIG. 2 may be suitable for a wide-screen device, for example, a computer, while the display interface in FIG. 3 may be suitable for a narrow-screen device, for example, a mobile phone, etc. The first message may be a message in a single chat session, or may also be a message in a group chat session. In some embodiments, as shown in FIG. 4, the first message has a corresponding option control; and display of the option control may be triggered by means of, for example, long press, right click, or making a control flag hover over the first message; and then, as shown in FIG. 4, the control for tagging ("Tag" in FIG. 4) is clicked.

S12: displaying a first interface, in response to a third operation event for an interface entrance of the first interface; and displaying the first session, which is tagged, and the first message, which is tagged, on the first interface.

Figure 3:
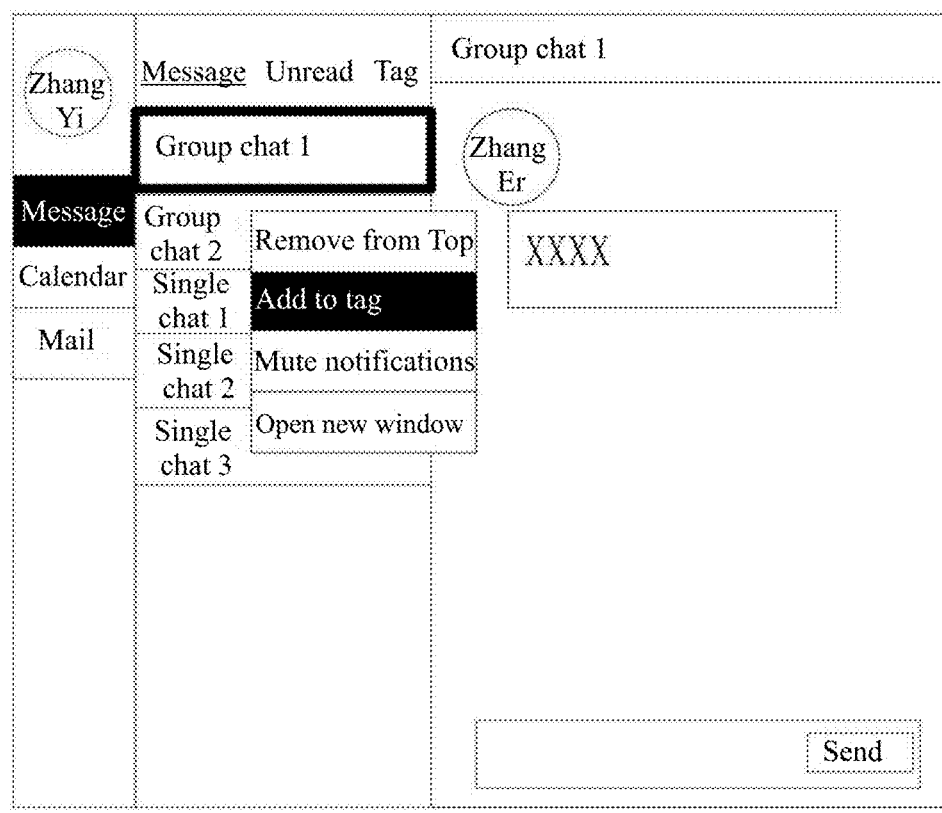
Figure 4:
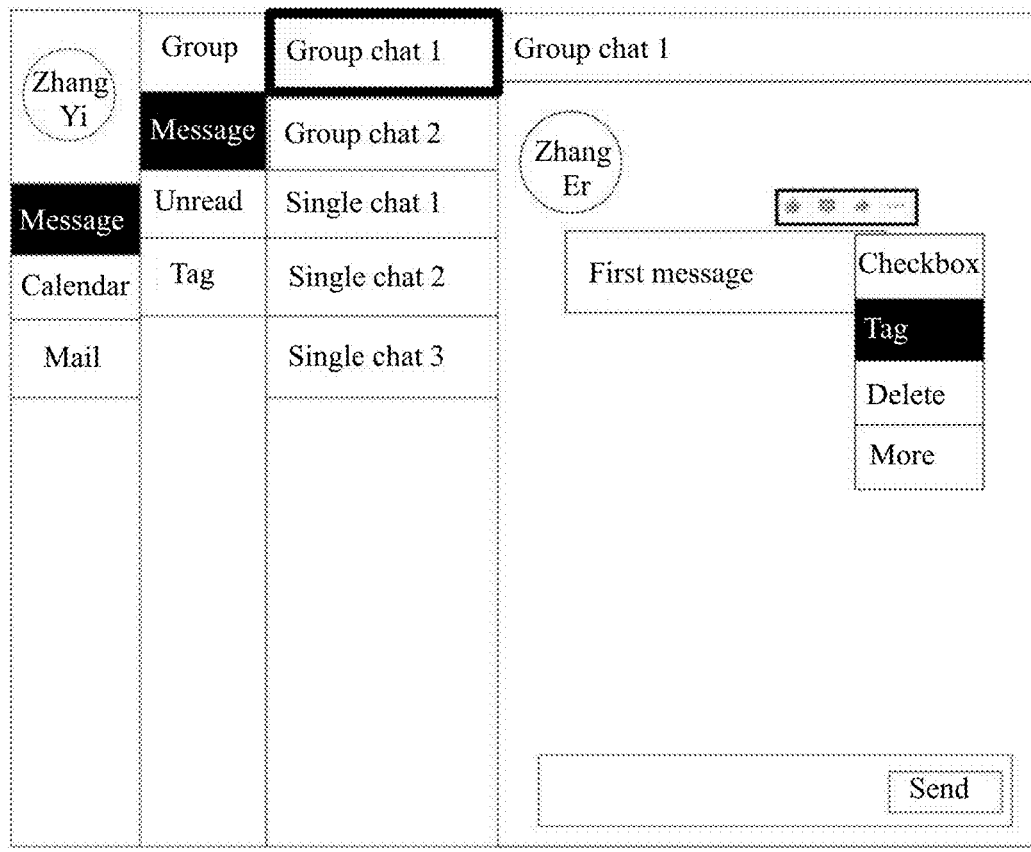
Figure 5:
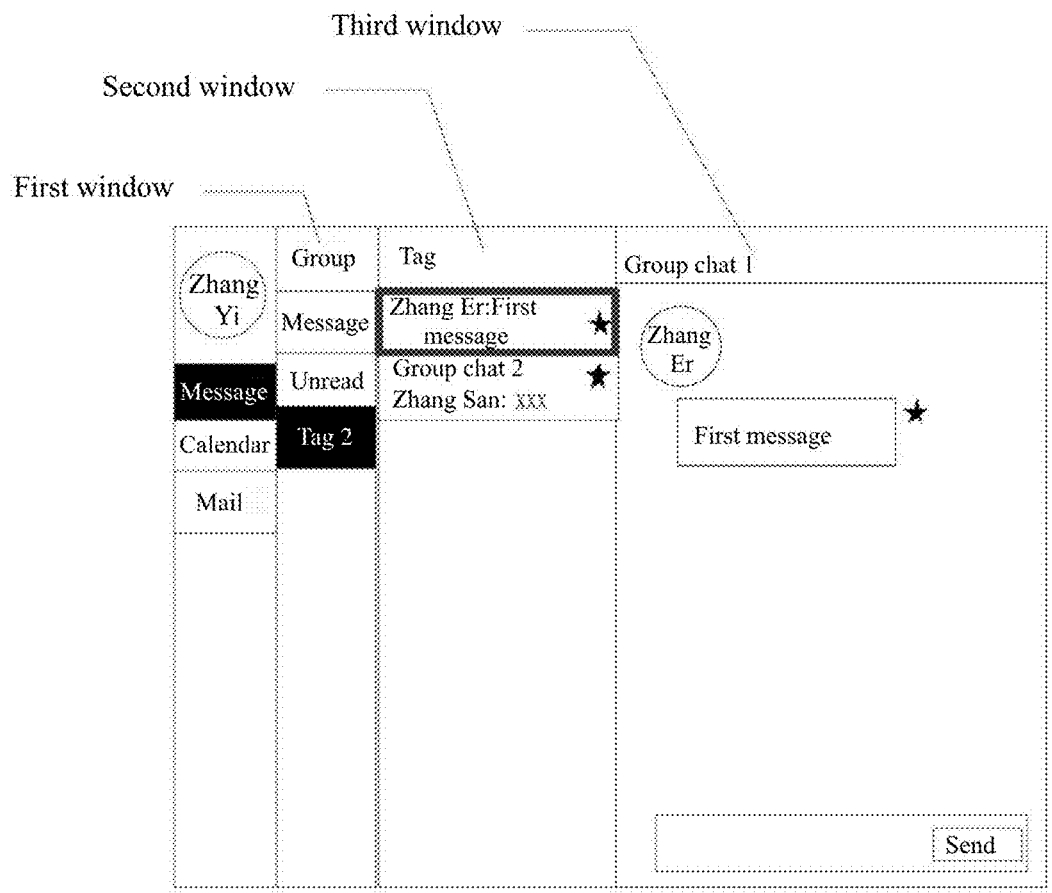
Figure 6:
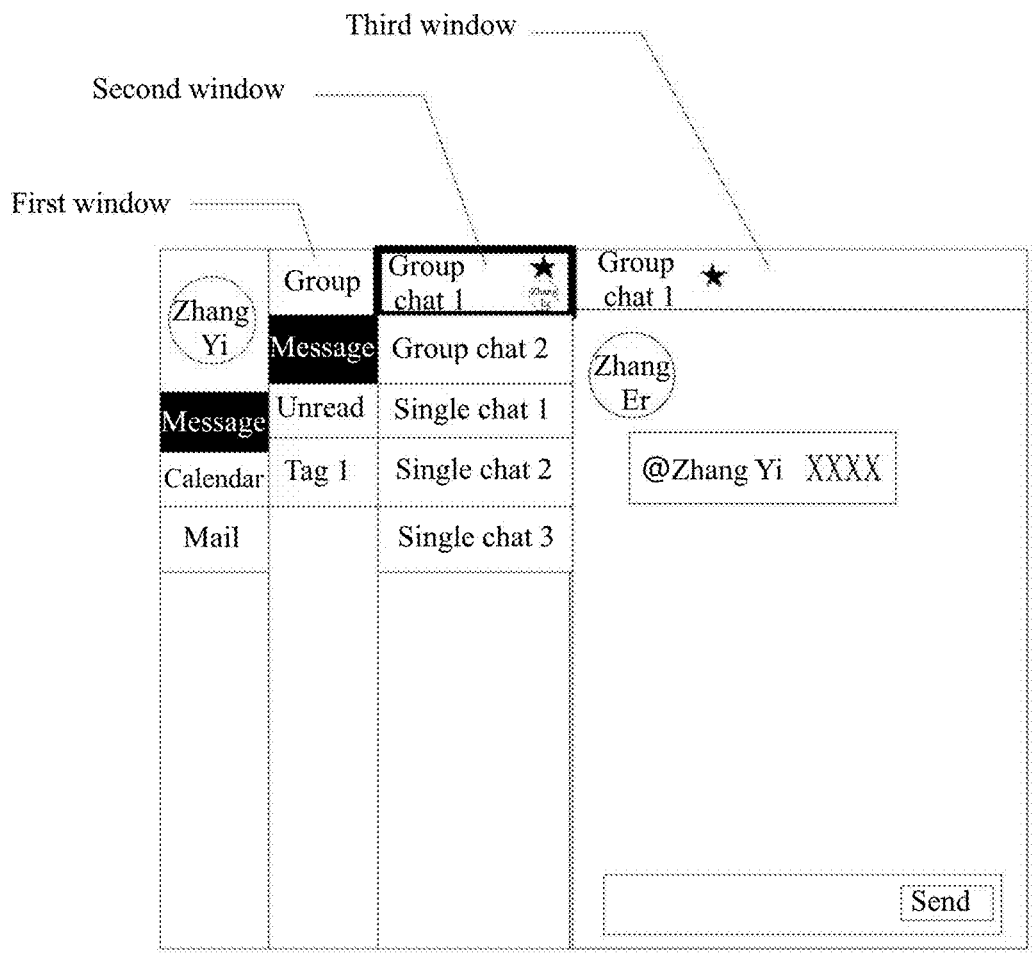

In some embodiments, the interface entrance may be a group of a first window displayed in the communication client: as shown in FIG. 6, the first window may be a column region shown in a second column on a left side of FIG. 6 (the first window in FIG. 6 includes "Group", "Message", "Unread", "Tag 1"); for example, the interface entrance of the first interface, for example, may be a "Tag" group in the second column in FIG. 2, or may also be an information flow in the second window of a client interface, for example, a "Tag" information flow horizontally arranged in a third position counted from the left in the second column in FIG. 3. For convenience of search by the user, the interface entrance of the first interface may be displayed on a same interface as the session entrance of the session: for example, as shown in FIG. 2, "Tag" located in the second column is displayed under the "Message" group in the first column, to facilitate the user to find the interface entrance. In some embodiments, the third operation event, for example, may include click, etc., thereby triggering the interface entrance, as shown in FIG. 5; after the interface entrance is triggered, the first interface is displayed: the first interface may be displayed in the second window (the second window may be a column region shown in a third column counted from the left in FIG. 6; and the column region includes "Group chat 1", "Group chat 2", "Single chat 1", "Single chat 2" and "Single chat 3"); and the tagged session and the tagged message will be displayed on the first interface, so that the user may find the followed session and message on the first interface without having to respectively search different interfaces for the followed session and message.

In some embodiments of the present disclosure, the user may tag the followed session and the followed message, and then the tagged session and message will be displayed on the first interface: in this way, the user may directly find all the followed sessions and messages on the first interface without having to respectively view the followed sessions and messages from different entrances, which reduces a difficulty in use by the user and is more convenient to maintain.

In some embodiments of the present disclosure, the information processing method further includes: opening a session interface of a second session which is tagged, in response to a trigger operation on the second session which is tagged on the first interface: or, opening a session interface where a second message which is tagged is located and positioning to a position where the second message, which is tagged, is located, in response to a trigger operation on the second message which is tagged on the first interface.

In some embodiments, the second session may be any tagged session, for example, may be the first session; and the second message may be any tagged message, for example, may be the first message. Referring to FIG. 5, a third column from left to right in FIG. 5 is the first interface, which is located in the second window: the tagged session and message are displayed on the first interface; and in FIG. 5, "Zhang Er: first message" is a tagged message. The tagged message is triggered by means such as clicking, at this time, as shown in FIG. 5, the session where the tagged message is located may be opened to the right of the second window or by means of a pop-up window: the displayed session interface (also referred to as an interactive interface) is located in the third window, and is positioned to a position of the tagged message in the session, so that the user may quickly view a source and context of the tagged message on the first interface. As shown in FIG. 5, there may also be a tagged session on the first interface. The tagged session may be triggered by means such as clicking; and the session is opened after the tagged session is triggered.

In some embodiments of the present disclosure, the information processing method further includes: tagging a single message collected to favorites, in response to there being a single message collected to favorites. In some embodiments, the user may have previously collected one or more single messages to favorites: the messages collected to favorites are displayed in a favorites folder; and considering that the messages collected to favorites are messages that the user is more interested in, the messages collected to favorites may be automatically tagged.

In some embodiments of the present disclosure, the information processing method further includes: respectively tagging at least 2 messages jointly collected to favorites, in response to there being at least 2 messages jointly collected to favorites. In some embodiments, the messages being jointly collected to favorites refers to at least 2 messages being jointly collected to favorites as a whole; in some embodiments of the present disclosure, the respective messages in the messages jointly collected to favorites may be automatically tagged respectively. In other embodiments, the messages jointly collected to favorites may not be tagged.

In some embodiments of the present disclosure, the information processing method further includes: collecting the tagged message to favorites. In some embodiments, the tagged message is a message that the user is more interested in, so after being tagged, the message may be automatically collected to a favorites folder, without an additional collection operation executed by the user. In some embodiments, collecting to favorites and tagging are two different functions, but both are used for recording content that the user is interested in. In related technologies, collecting to favorites is already a mature function, and the user is accustomed to using the collection function; if the collection function is directly cancelled, changes in usage habits of the user may cause inconvenience to the user. Therefore, in some embodiments, the entrance to open collected content may be retained firstly, so that the user may view the collected content through the entrance; after the user becomes accustomed to using the tagging function (e.g., the interface entrance of the first interface has been triggered a preset number of times), the entrance to the collected content may be canceled, so as to ensure smooth transition of usage habits of the user.

In some embodiments of the present disclosure, the information processing method further includes: displaying a first flag in a first state in the session entrance of the first session, after tagging the first session, or displaying the first flag in the first state in the session entrance of the first session and hiding the latest update time. As shown in FIG. 6, the client interface displays the first window, the second window and the third window that do not overlap with each other; wherein the first window is used for displaying group information; the group information includes information of a plurality of groups (e.g., in FIG. 6, Message, Unread and Tag in the first window are each one group), and each group corresponds to an information flow filtered out by using a preset filtering condition of the group; the second window is used for displaying an information flow, and the information flow includes one or both of session and message (e.g., the message group has group chats or single chats with messages displayed therein; and the unread group has unread sessions displayed therein); the third window is used for displaying an interactive interface corresponding to a currently selected session or message in the second window; and as shown in FIG. 6, the group information of the first window includes a tag. In some embodiments, the session entrance of the first session includes a session card in the information flow; specifically, referring to FIG. 6, the column region in the third column from left to right is the second window, in which a plurality of session cards are set; the session entrance of the first session may be a session card in the information flow displayed in the second window; the information flow includes a session and a message; one session or one message is one information flow; the information flow of the session displayed in the second window displays a name of the session in a form of session card; the second window displays the session cards as the session entrances for the respective sessions; with respect to the tagged session (e.g., Group chat 1 in FIG. 6), a first flag is displayed at the session entrance (e.g., a star in an upper right corner of Group chat 1 in the second window in FIG. 6); the first flag may have a first state and a second state, which, for example, may respectively be an interior blank state or an interior padded state. With respect to an untagged session, the corresponding session entrance may display the latest update time; and the latest update time is time when a message was received most recently. In some embodiments, when the session card only displays a mute flag or a flag of a user sending an @message, the mute flag and the flag of the user sending the @message may be arranged in an aligned display manner as shown in FIG. 6.

In some embodiments of the present disclosure, the information processing method further incudes: displaying a second flag in the session interface of the first session after tagging the first session. In some embodiments, with continued reference to FIG. 6, the third window on the right side of FIG. 6 displays the session interface (also referred to as an interactive interface) of Group chat 1; Group chat 1 is a tagged session, as shown in FIG. 6, a title region of the session interface displays the second flag (a five-pointed "star"), so that when a separate window is adopted to display the session interface, the user may also determine whether it is a tagged session through the session interface.

In some embodiments of the present disclosure, the information processing method further includes: changing a display style of the first message on the session interface, after tagging the first message, to distinguish from an untagged message. In some embodiments, the tagged message may be displayed on the session interface in a highlighted manner, to distinguish from an untagged message, or the tagged message may also have a border color changed to distinguish from an untagged message.

Figure 7:
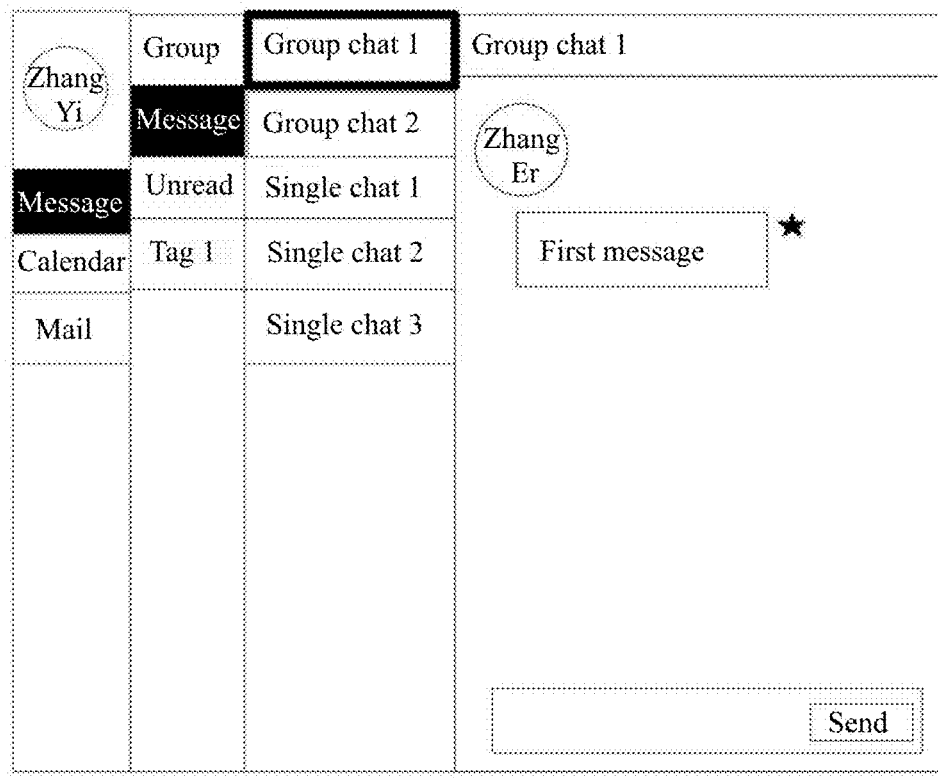

In some embodiments of the present disclosure, the information processing method further includes: displaying a third flag in the first state in an associated position of the first message on the session interface, after tagging the first message. In some embodiments, as shown in FIG. 7, the first message in Group chat 1 in FIG. 7 is a tagged message; after the first message is tagged, the session interface displays the third flag (a star on the right side of the first message in FIG. 7); the third flag may have a first state and a second state; the first state may be a state that the interior of the star is padded, and the second state may be a state that the interior of the star is unpadded; and the tagged message is distinguished from the untagged message in the session interface through the third flag.

In some embodiments of the present disclosure, the information processing method further includes: displaying a first prompt message, if the first session or the first message is not successfully tagged. In some embodiments, the first session or the first message may not be successfully tagged due to reasons such as network, and at this time, a prompt message may be issued, for example, prompting tagging failed and prompting retry.

In some embodiments of the present disclosure, the information processing method further includes: changing the first session from an unprocessed state to a processed state, in response to a fourth operation event for the first session, and canceling tag of the first session. In some embodiments, the unprocessed state, for example, may be an unaccomplished state, while the processed state may be an accomplished state; for a session, which may be a session having an item or a task, the user may click to accomplish the session to indicate the item or the task accomplished, which, at this time, indicates that the user has processed content in the session and no longer follows the session, so, tagging of the session may be canceled. In some embodiments, referring to FIG. 8E and FIG. 8F, the session entrance of the first session may display an accomplish flag (√ in F FIGS. 8A-8F); the accomplish flag may be triggered to switch the session between the processed state and the unprocessed state; and the fourth operation event is a trigger operation, for example, a click, on the accomplish flag.

Figure 9:
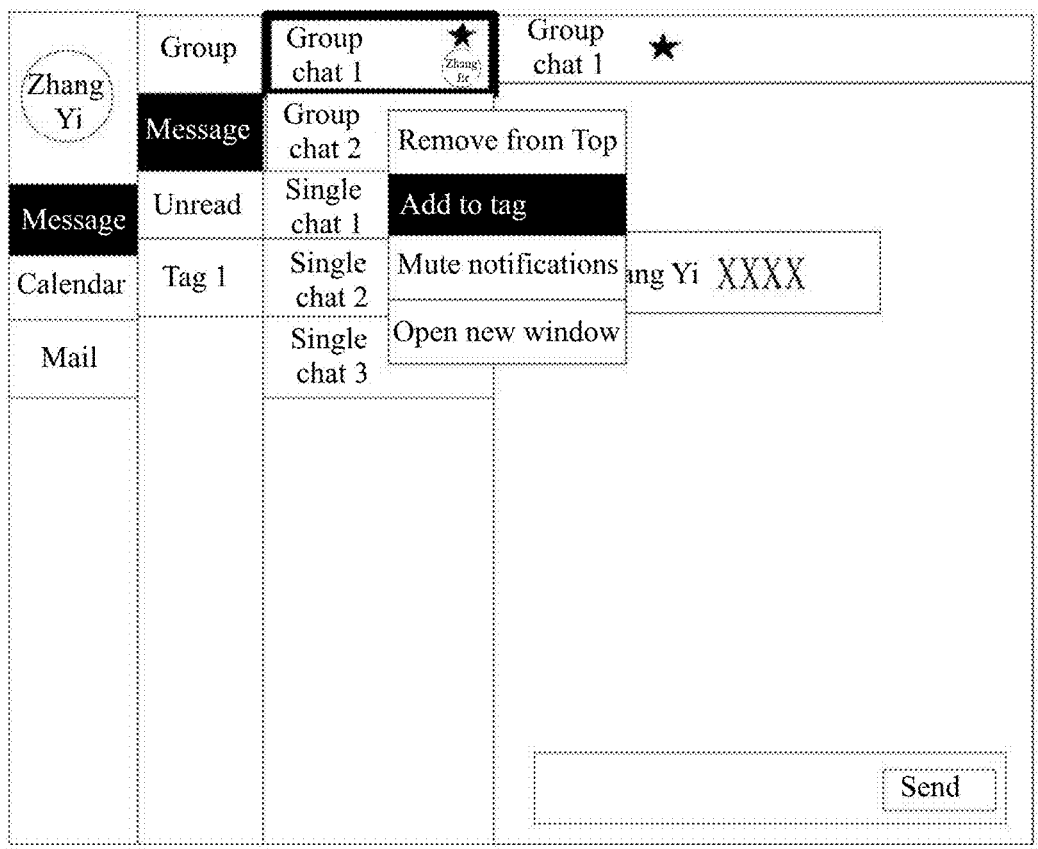

In some embodiments of the present disclosure, the information processing method further includes: canceling tag of the first session, in response to a trigger operation on a first control associated with the first session. In some embodiments, as shown in FIG. 9, for the tagged first session, an option control list may be called up by means of long pressing or right clicking at the session entrance of the first session, and the first control ("Cancel tag" in FIG. 9) in the option control list may be triggered by means such as clicking, to cancel tag of the first session.

Figure 10:
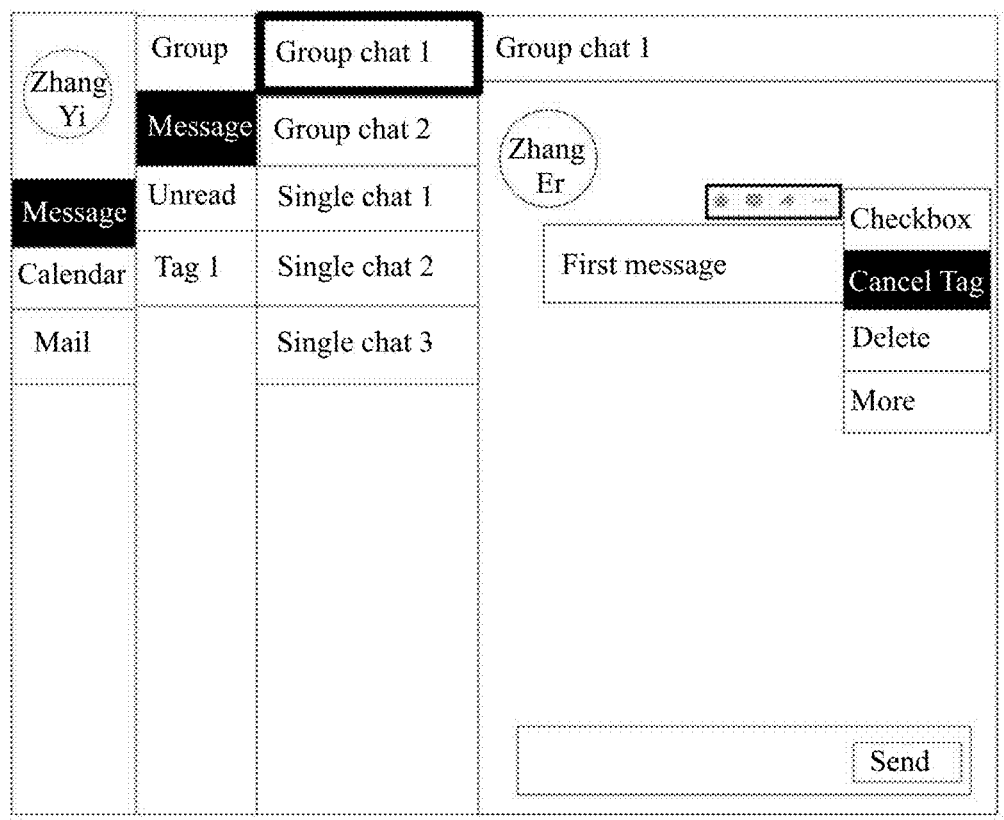

In some embodiments of the present disclosure, the information processing method further includes: canceling tag of the first message, in response to a trigger operation on a second control associated with the first message. In some embodiments, as shown in FIG. 10, for the first message in the session interface, the option control list is called up by means of long pressing or right clicking, and the second control ("Cancel tag" in FIG. 10) in the option control list is triggered by means such as clicking, to cancel tag of the first message.

Figure 8:
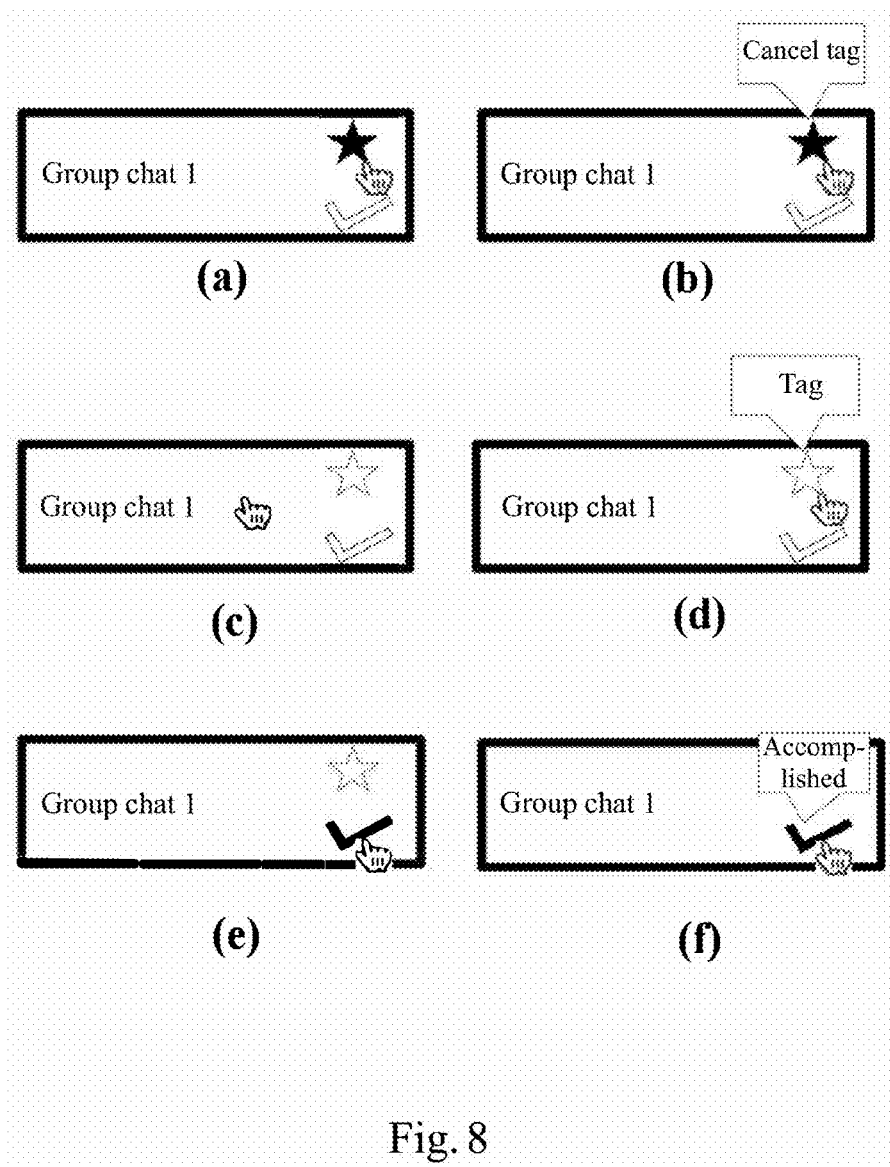

In some embodiments of the present disclosure, the information processing method further includes: displaying the first flag in the first state in the session entrance of the first session after tagging the first session; and canceling display of the first flag and canceling tag of the first session, in response to a trigger operation on the first flag in the first state of the first session. In some embodiments, FIGS. 8A-8F shows a display style of the session entrance of the first session (Group chat 1); as shown in FIG. 9, it schematically shows a style of the first flag displayed at the session entrance of the first session (Group chat 1) (the first flag is a five-pointed star in the upper right corner of the session entrance of Group chat 1 in the second window); as shown in FIG. 8A, it shows the first flag in the first state; and when a control flag hovers over the first flag in the first state, "Cancel tag" is prompted as shown in FIG. 8B. At this time, the first flag in the first state may be triggered by means such as clicking; then, as shown in FIG. 8C, the first flag in the first state may be converted to the first flag in the second state (the unpadded star in FIG. 8C); and at this time, tag of the first session may be canceled, and thereafter, display of the first flag may be canceled.

In some embodiments of the present disclosure, the information processing method further includes: displaying a third flag in the first state in an associated position of the first message on the session interface, after tagging the first message; and canceling display of the third flag and canceling tag of the first message, in response to a trigger operation on the third flag in the first state of the first message. In some embodiments, as shown in FIG. 7, the star (the third flag) next to the first message in FIG. 7 may be clicked to cancel tag of the first message; and at this time, the third flag may be firstly converted to the third flag in the second state, and after a certain period of time, display of the third flag may be canceled.

In some embodiments of the present disclosure, the information processing method further includes: displaying the first flag in the first state in the session entrance of the first session, after tagging the first session; converting the first flag in the first state to the first flag in the second state, in response to a trigger operation on the first flag in the first state of the first session; keeping display of the first flag in the second state, before moving the control flag away from the session entrance of the first session; and hiding the first flag in the second state, after moving the control flag away from the entrance of the first session, wherein if the first flag in the second state in the display state is triggered, the first session is tagged again. In some embodiments, the control flag, for example, may be a mouse, etc.; referring to FIGS. 8A-8F, in FIG. 8A, after the first flag in the first state (a star in FIG. 8A) is triggered through the control flag (a hand-shaped symbol in FIGS. 8A-8F) to cancel tag of the first session, if the control flag is not moved away from the session entrance of the first session, then as shown in FIG. 8C, the first flag is converted from the first state to the second state, but the first flag does not disappear, then the first session may be tagged again by triggering the first flag again; after the control flag is moved away from the session entrance of the first session, the first flag will disappear, and at this time, the first session may no longer be tagged by triggering the first flag. This may prevent canceling tag of the first session due to accidental touch.

In some embodiments of the present disclosure, the method further includes: changing the first session from an unprocessed state to a processed state, in response to a fourth operation event on the first session, and canceling tag of the first session; changing the first session to an unprocessed state and keeping the first session in an untagged state, in response to a fifth operation event on the first session, after changing the first session from the unprocessed state to the processed state. In some embodiments, as shown in FIG. 8A, the session entrance of the first session displays the third flag (1 in FIGS. 8A-8F); the third flag may be triggered to switch between the processed state and the unprocessed state; after tagging the first session as the processed state (e.g., the accomplished state), tag of the first session will be automatically canceled; thereafter, if the first session is changed to the unprocessed state, tag will not be automatically restored. In some embodiments, after the tagged session and the tagged message have been canceled the tag, the session and the message having been canceled the tag are correspondingly removed on the first interface.

In some embodiments of the present disclosure, the tagged session and the tagged message are sorted according to time respectively corresponding thereto on the first interface; wherein the time corresponding to the tagged session is generation time of the latest message in the session, and the time corresponding to the tagged message is time when the message is tagged; or, the time corresponding to the tagged session is time when the session is tagged, and the time corresponding to the tagged message is time when the message is tagged. In some embodiments, the tagged session and the tagged message displayed on the first interface are sorted in a time order, the closer the time corresponding thereto, the higher the rank of display; the time corresponding to the session may be time when the session is tagged, or may also be generation time of the latest message in the session; at this time, a position of the tagged session is changeable; the time corresponding to the message is the time when the message is tagged; it may be the case where sessions and messages are mixed together, or it may also be the case where sessions are clustered together and messages are clustered together, with the sessions displayed as a whole before the messages, or the messages displayed as a whole before the sessions; because the tagged session and tagged message are sorted in a time order, a position order thereof changes with time corresponding thereto.

In some embodiments of the present disclosure, the tagged session and the tagged message displayed on the first interface display a fourth flag, which is associated to the tagged session and the tagged message, in the first state; the information processing method further includes: converting the fourth flag which is triggered to the second state, in response to a trigger operation on the fourth flag in the first state on the first interface; and canceling tag of the session or the message associated with the fourth flag which is triggered. In some embodiments, as shown in FIG. 5, a third column from left to right in FIG. 5 is the first interface, and the first interface is located in the second window, in which the tagged session and message display a star as the fourth flag; the star may be triggered to cancel a tag; after the star is triggered, the first state is converted to the second state, for example, an interior padded state is converted to an unpadded state.

In some embodiments of the present disclosure, after the converting the fourth flag which is triggered to the second state, and canceling tag of the session or the message associated with the fourth flag which is triggered, the method further includes: keeping display of the session or the message associated with the fourth flag which is triggered on the first interface, and keeping display of the fourth flag in the second state, before the control flag is transferred to other session or message; and hiding the fourth flag in the second state, after transferring the control flag to other session or message; wherein if the fourth flag in the second state in the display state is triggered, the session or the message associated with the fourth flag which is triggered is tagged again.

In some embodiments, as shown in FIG. 5, the fourth flag (the star in the second window) in FIG. 5 may be clicked through the control flag, to cancel tag of the session and the message on the first interface; but the session and the message having been canceled the tag will not be immediately removed from the first interface; if the control flag is kept on the session or the message having been canceled the tag, and display of the fourth flag is kept, then the fourth flag may be clicked again to tag the session or the message; if the control flag is moved away from the session or the message having been canceled the tag without triggering the fourth flag in the second state, then the fourth flag in the second state will be hidden, and then the session or the message having been canceled the tag may be removed from the first interface.

In some embodiments of the present disclosure, the session or the message displayed on the first interface is an information flow, which may be displayed in a form of session card or message card. The session card may display a session avatar, a session name, message preview in the session, and the fourth flag. The message card may display an avatar and a name of a message sender, a message source, message preview, and the fourth flag.

In some embodiments of the present disclosure, the information processing method further includes: displaying a fifth flag of a first style at the third session displayed on the first interface, if the third session is not a mute session, and displaying a fifth flag of a second style at the third session displayed on the first interface, if the third session is a mute session, in response to the tagged third session receiving an unread message. In some embodiments, the third session may be any tagged session, for example, the third session may be the first session. After receiving an unread message, the fifth flag will be displayed at the third session; the fifth flag, for example, may be a digit; the digit represents the amount of unread messages; the fifth flag has different styles based on whether the third session is a mute session, that is, the first style and the second style may differ from each other, for example, the first style and the second style differ from each other in color, font, or shape. In some embodiments, the mute session refers to a session without a ringing or vibrating reminder after a message is generated. Different display styles also allow the user to distinguish between a mute session and a non-mute session on the first interface.

In some embodiments of the present disclosure, the information processing method further includes: displaying a sixth flag in the fourth session displayed on the first interface, in response to the fourth session tagged as a mute session having no unread message, the sixth flag being used for tagging a mute session; hiding the sixth flag and displaying a flag of a person mentioning the current user in the fourth session displayed on the first interface, in response to the fourth session receiving an unread message mentioning the current user. In some embodiments, for the mute session, the sixth flag, namely, the mute flag, will be displayed in the fourth session. When there is a message mentioning the current user (e.g., @ the current user), the flag of the person mentioning the current user is displayed; for example, in the fourth session, if user A sends a message @ the current user, an avatar of user A is displayed and the sixth flag is hidden in the fourth session on the first interface. That is, the mute fourth session displays the sixth flag when there is no new unread message, and does not display the sixth flag when there is an unread message mentioning the current user. Because through the fifth flag of the second style displayed when there is an unread message, it may already be determined that the fourth session is a mute session, there is no need to continue displaying the sixth flag.

In some embodiments of the present disclosure, for the tagged session displayed on the first interface, interaction, for example, adding the tagged session to a specified location, canceling tag, setting to a mute session with mute notifications, opening in an individual window, or adding to a specific group, may be carried out.

Figure 12:
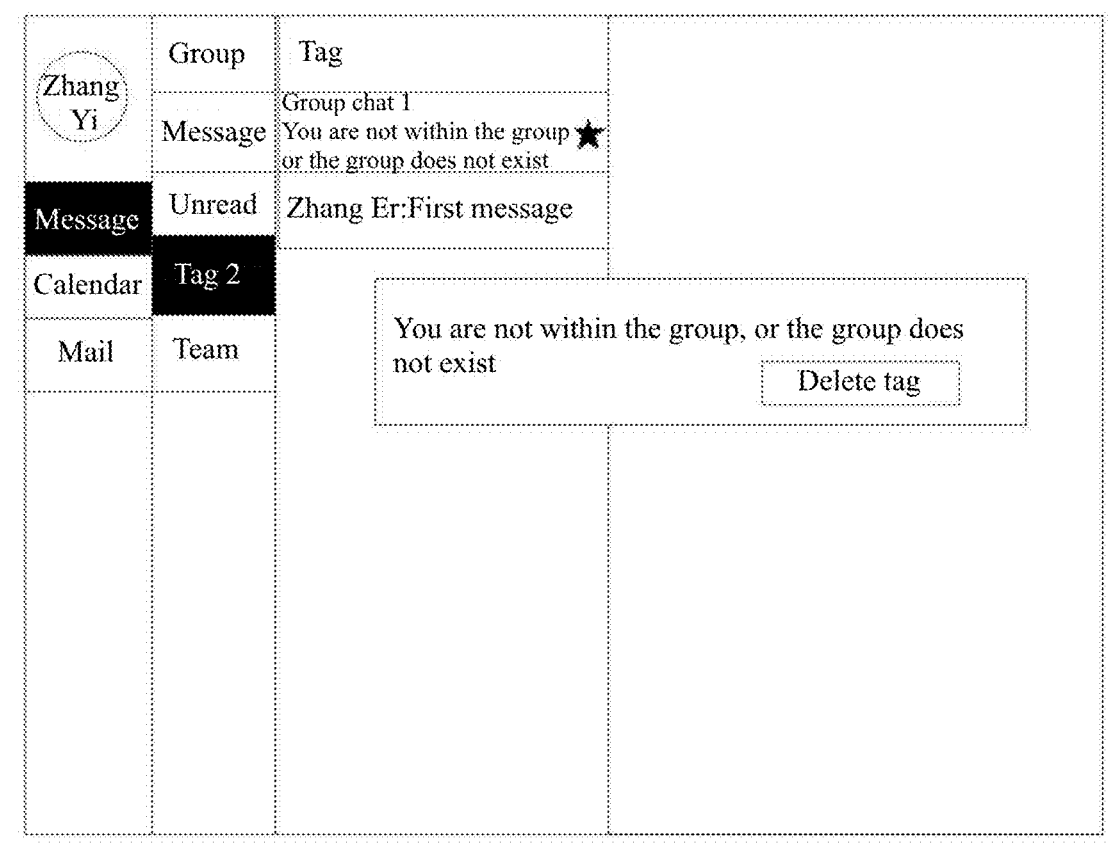

In some embodiments of the present disclosure, the second session is a session of a first-category group; if the current user is not within a group of the second session or the group of the second session has been dissolved, then the session interface of the second session is not opened and a second prompt message is displayed, in response to a trigger operation on the second session which is tagged on the first interface. In some embodiments, the first-category group may be a non-public group; and the non-public group may be a group that requires verification upon joining. For a non-public group, the user may actively exit the first-category group or be removed from the first-category group by an administrator; if the current user is within the first-category group, then the session interface of the second session may be opened by triggering the second session on the first interface; however, if the current user is no longer within the first-category group of the second session or the first-category group has been dissolved, then as shown in FIG. 12, Group chat 1 is a first-category group, the current user is not in Group chat 1, at this time, the tagged session in Group chat 1 on the first interface will be triggered, the second prompt message will be displayed as shown in FIG. 12, and a control for canceling tag of the second session may be displayed in the second prompt message.

In some embodiments of the present disclosure, the second session is a session of a second-category group; if the current user is not within the group of the second session, then the session interface of the second session is opened in response to a trigger operation on the second session which is tagged on the first interface. In some embodiments, the second-category group may be a public group; the public group is a group that does not require verification upon joining; at this time, the group of the second session is not dissolved; when the second session on the first interface is triggered, because the group of the second session is a public group, messages therein may be viewed; and therefore, when the session interface of the second session is opened, the user may automatically join the second-category group when opening the session interface of the first session.

In some embodiments of the present disclosure, the displaying the tagged message on the first interface, includes: hiding a session of a message source, if the tagged message is a message in a single chat session. In some embodiments, a sender will be displayed in the tagged message exhibited on the first interface; if the tagged message is a message in a single chat between the current user and another user, the session of the message source will not be displayed because the session name is the same as that of the sender, so as to avoid repeated display.

In some embodiments of the present disclosure, the displaying the tagged message on the first interface, includes: displaying the session of the tagged message source on the first interface, if the tagged message is a message in a group chat session. In some embodiments, when the tagged message is a message in a group chat session, a sender will be displayed, and the name of the group chat session from which the message comes, that is, the session of the flag message source, also needs to be displayed, so that the group chat session from which the message comes may be known.

In some embodiments of the present disclosure, the displaying the tagged message on the first interface, includes: displaying message content of the tagged message on the first interface. In some embodiments, the first message displayed on the first interface will display the message content, so that the user may quickly understand specific content.

In some embodiments of the present disclosure, the displaying message content of the tagged message on the first interface, includes: displaying the message content in the tagged message whose length does not exceed a preset length, on the first interface; in some embodiments, the tagged message displayed may be set to display at most three lines of preview text. In some embodiments, if the tagged message has a link therein, the link is displayed. At this time, the link may not be parsed as a card, and specific content of the link is not displayed in the tagged message on the first interface. In some embodiments, if the tagged message includes multimedia content, the multimedia content is displayed. In some embodiments, when the message content of the tagged message includes multimedia content, a sender's name and a multimedia type may be exhibited in text in the tagged message, and the multimedia content is exhibited in a line break manner close to the text, for example, below the text. For the multimedia content in the tagged message, the multimedia content may be transferred to cloud space; if the multimedia content is a table, the multimedia content may be converted to an online table. In some embodiments, if one session has a plurality of messages tagged therein, the plurality of messages respectively are served as different tagged messages exhibited on the first interface; and the tagged messages and the tagged sessions on the first interface may be exhibited in a form of list.

In some embodiments of the present disclosure, the opening the session interface where the second message which is tagged is located and positioning to a position where the second message which is tagged is located, in response to a trigger operation on the second message which is tagged on the first interface, includes: opening the session interface where the second message which is tagged is located and positioning to a position where the second message which is tagged is originally located, if the second message which is tagged has been recalled.

In some embodiments, if the second message is neither recalled nor deleted, then the session interface where the second message is located may be opened after triggering the second message by means such as clicking; specifically, the session interface where the second message is located may be opened in a separate window or a next-level window (e.g., the third window), so as to keep displaying the first interface, so that the user may refer to the second message with other messages on the first interface. If the second message has been recalled, then the session interface where the second message is located is still opened and positioned to a position where the second message is originally located before being recalled, so that the user may refer to the context. In some embodiments, for the second message which is tagged, even if the second message is recalled, the second message is still displayed on the first interface, and the message content in the second message is displayed on the first interface. Recalling the second message on the session interface does not affect the second message which is tagged on the first interface.

In some embodiments, if the second message which is tagged has been deleted by the current user, then the session interface where the second message which is tagged is located is opened. In some embodiments, after the second message is deleted by the current user, the second message cannot be positioned, but the session interface where the second message is located is still opened; and at this time, the second message may be deleted from the first interface or may also be retained.

In some embodiments, if the second message which is tagged is a message of the first group and the current user is not within the first group, the session interface of the first group is not opened and a third prompt message is displayed. In some embodiments, when the current user is not within the first group and the second message is a message of the first group, if the second message is triggered, then the session interface of the first group is not opened, and the third prompt message is displayed prompting that the current user is not within the first group.

In some embodiments of the present disclosure, the third message is deleted from the first interface, in response to the tagged third message being deleted by the current user from the session interface where the third message is located; wherein the current user is a user who has the first interface displayed through a third operation event. In some embodiments, the third message is a message tagged by the current user; when the third message is deleted from the session interface, it indicates that the current user no longer follows the third message, because it is the current user who deletes the third message from the session interface where the third message is located, and thus deletes the third message from the first interface. The third message may be any tagged message, for example, may be the first message or the second message. In some embodiments, deleting a message refers to a case where, from a perspective of the current user, the message disappears but is still visible to others, and previous collection of the third message may not be affected, or collection of the third message may also be canceled.

In some embodiments of the present disclosure, for the tagged message on the first interface, display of an option control may be triggered by right clicking, and the tagged message may be forwarded or have tag canceled through the option control.

Figure 11:
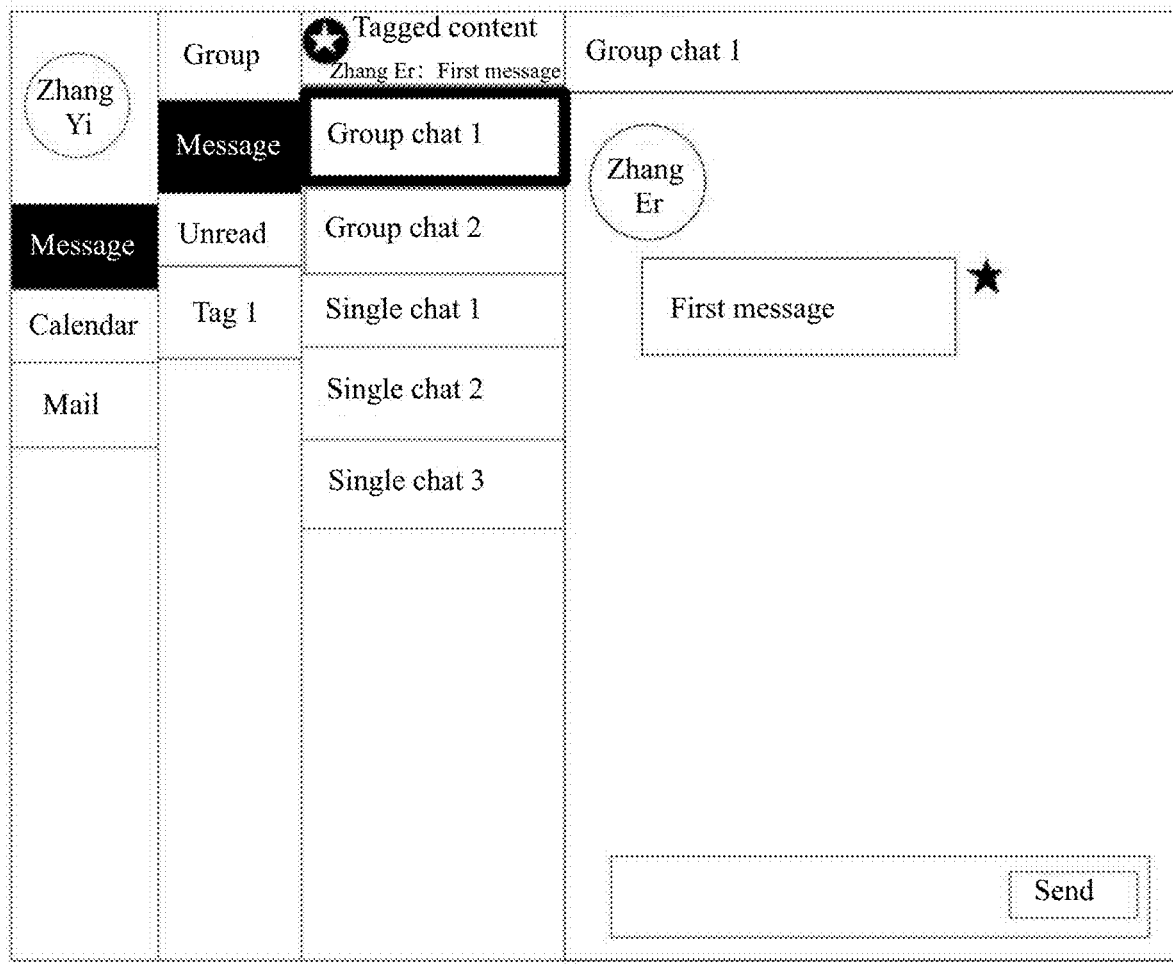

In some embodiments of the present disclosure, the method further includes: displaying an interface entrance of the first interface in an information flow list. In some embodiments, in order to facilitate the user to quickly find the interface entrance, the interface entrance of the first interface may be displayed in the information flow list, after tagging any session or any message; the information flow list is used for exhibiting entrances of respective sessions, messages, notifications, etc., and may be located in the second window, as shown in FIG. 11, the information flow list displays sessions such as Group chat 1 and Group chat 2, and displays the interface entrance on the session interface, which is a region most frequently used by the user; the user may open the first interface like entering a session; for the interface entrance, a position of the interface entrance of the first interface in the session list may be determined at least according to the time of the tagged session or message on the first interface. In some embodiments, the time corresponding to the tagged session is generation time of the latest message in the session, and the time corresponding to the tagged message is time when the message is tagged; or, the time corresponding to the tagged session is time when the session is tagged, and the time corresponding to the tagged message is time when the message is tagged. That is, the interface entrance has corresponding update time, and other session also has update time; the update time of the session may be time when the message is mostly recently received or input; the interface entrance and the respective session entrances may be displayed in an order of update time in the session list, with the most recently updated one displayed at the top, so that the interface entrance may be exhibited in a form similar to a session entrance, and has a position thereof dynamically updated; the position of the interface entrance of the first interface in the information flow list is changeable; when a session in the interface entrance generates a new message, the interface entrance may be placed at the top; similarly, the position of the interface entrance of the first interface in the information flow list may be determined according to update events of other information item (session or message) in the information flow list, for example, when a new message is generated in other session, the other session may be placed at the top, and the interface entrance of the first interface may be moved down in sequence. In this way, when there is a newly tagged session or message, or when the tagged session generates a new message, the interface entrance may be placed at the top, to facilitate viewing by the user.

In some embodiments of the present disclosure, the interface entrance of the first interface displays at least one of: a seventh flag, an interface name, and the most recently tagged session or message. In some embodiments, as shown in FIG. 11, the top of the third column (the second window) from left to right in FIG. 11 displays the interface entrance of the first interface, in which the seventh flag (a circle with a star inside in FIG. 11), the interface name ("tagged content" in FIG. 11), and the most recently tagged content ("Zhang Er: first message" in FIG. 11) are displayed. By displaying the above-described content at the interface entrance, the user may quickly learn about the most recently tagged content, prompting the user to process in a timely manner. If the most recently tagged content is a session, a session name may be exhibited; if the most recently tagged content is a message, a sender name and message content preview may be exhibited. In the interface entrance, time may not be exhibited; by clicking on the interface entrance, the first interface may be displayed in a form of second-level page; the second-level page may be a page opened on one side of the interface entrance, at this time, display of the interface entrance may still be kept; and the first interface may also be displayed in a form of pop-up window.

In some embodiments of the present disclosure, the information processing method further includes: displaying statistical data at the interface entrance of the first interface, wherein the statistical data includes: at least one of the total amount of tagged messages and tagged sessions, the amount of tagged messages, and the amount of tagged sessions. In some embodiments, as shown in FIG. 5, "Tag 2" is displayed in a tagged group in a second column from left to right in FIG. 5, wherein the digit "2" represents the total amount of tagged messages and tagged sessions; and the amount of tagged sessions and the amount of tagged messages may further be respectively displayed. This may prompt the user to process the tagged sessions and messages in a timely manner.

In some embodiments of the present disclosure, the client interface displays the first window, the second window and the third window that do not overlap with each other; wherein the first window is used for displaying group information; the group information includes information of a plurality of groups, and each group corresponds to an information flow filtered out by using a preset filtering condition of the group; the second window is used for displaying an information flow; and the information flow includes one or both of session and message; the third window is used for displaying an interactive interface corresponding to a currently selected session or message in the second window; the group information of the first window includes tag; the displaying a first interface, in response to a third operation event for an interface entrance of the first interface, includes: displaying the first interface in the second window, in response to a trigger operation on the tag in the first window. In some embodiments, as shown in FIG. 6, the client interface displays the first window, the second window and the third window; the first window has information of a plurality of groups (message, unread, tag); after selecting a group, an information flow (Group chat 1, Group chat 2, Single chat 1, Single chat 2, and Single chat 3 shown in FIG. 6, as well as notification message) associated with the selected group will be displayed in the second window; after selecting an information flow, the third window will be displayed (e.g., after the information flow of Group chat 1 is selected in FIG. 6, an interactive interface of Group chat 1 will be displayed). In this embodiment, the first window is set with a group corresponding to a tag, as shown in FIG. 5, after the group corresponding to the tag is triggered by means such as clicking, the first interface will be displayed, and the tagged group and session will be exhibited.

An embodiment of the present application further proposes an information processing apparatus, including:

a tagging unit, configured to tag a first session, in response to a first operation event for the first session; or, tag a first message, in response to a second operation event for the first message on a session interface; and a control unit, configured to display a first interface, in response to a third operation event for an interface entrance of the first interface; and display the tagged session and the tagged message on the first interface.

In some embodiments, the control unit is further configured to execute at least one of:

opening a session interface of a second session which is tagged, in response to a trigger operation on the second session which is tagged on the first interface; and opening a session interface where a second message which is tagged is located and positioning to the second message which is tagged, in response to a trigger operation on the second message which is tagged on the first interface.

In some embodiments, the control unit is further configured to execute at least one of:

displaying a first flag in a first state in the session entrance of the first session, after tagging the first session, or displaying the first flag in the first state in the session entrance of the first session and hiding the latest update time;

displaying a second flag in the session interface of the first session after tagging the first session;

changing a display style of the first message on the session interface, after tagging the first message, to distinguish from an untagged message;

displaying a third flag in the first state in an associated position of the first message on the session interface, after tagging the first message;

displaying a first prompt message, if the first session or the first message is not successfully tagged;

changing the first session from an unprocessed state to a processed state, in response to a fourth operation event for the first session, and canceling tag of the first session;

canceling tag of the first session, in response to a trigger operation on a first control associated with the first session;

canceling tag of the first message, in response to a trigger operation on a second control associated with the first message.

In some embodiments, the control unit is further configured to execute at least one of:

displaying the first flag in the first state in the session entrance of the first session after tagging the first session; and canceling display of the first flag and canceling tag of the first session, in response to a trigger operation on the first flag in the first state of the first session;

displaying a third flag in the first state in an associated position of the first message on the session interface, after tagging the first message; and canceling display of the third flag and canceling tag of the first message, in response to a trigger operation on the third flag in the first state of the first message.

In some embodiments, the control unit is further configured to execute at least one of:

displaying the first flag in the first state in the session entrance of the first session, after tagging the first session; converting the first flag in the first state to the first flag in the second state, in response to a trigger operation on the first flag in the first state of the first session; keeping display of the first flag in the second state, before moving a control flag away from the session entrance of the first session; and canceling tag of the first flag in the second state, after moving the control flag away from the entrance of the first session, wherein if the first flag in the second state in the display state is triggered, the first session is tagged again;

changing the first session from an unprocessed state to a processed state, in response to a fourth operation event on the first session, and canceling tag of the first session; changing the first session to an unprocessed state and keeping the first session in an untagged state, in response to a fifth operation event on the first session, after changing the first session from the unprocessed state to the processed state.

In some embodiments, the tagged session and the tagged message are sorted according to time respectively corresponding thereto on the first interface;

wherein time corresponding to the tagged session is generation time of the latest message in the session, and time corresponding to the tagged message is time when the message is tagged; or, the time corresponding to the tagged session is time when the session is tagged, and the time corresponding to the tagged message is time when the message is tagged.

In some embodiments, the tagged session and the tagged message displayed on the first interface display a fourth flag, which is associated to the first session and the first message, in the first state;

the control unit is further configured to: convert the fourth flag which is triggered to the second state, in response to a trigger operation on the fourth flag in the first state on the first interface; and cancel tag of the session or the message associated with the fourth flag which is triggered.

In some embodiments, the control unit is further configured to: keep display of the session or the message associated with the fourth flag which is triggered on the first interface, and keep display of the fourth flag in the second state, after converting the fourth flag which is triggered to the second state, and canceling tag of the session or the message associated with the fourth flag which is triggered, before transferring the control flag to other session or message; and hiding the fourth flag in the second state, after transferring the control flag to other session or message; wherein if the fourth flag in the second state in the display state is triggered, the session or the message associated with the fourth flag which is triggered is tagged again.

In some embodiments, the control unit is further configured to execute at least one of:

displaying a fifth flag of a first style at the third session displayed on the first interface, if the third session is not a mute session, and displaying a fifth flag of a second style at the third session displayed on the first interface, if the third session is a mute session, in response to the tagged third session receiving an unread message;

displaying a sixth flag in a fourth session displayed on the first interface, in response to the fourth session tagged as a mute session having no unread message, the sixth flag being used for tagging a mute session; hiding the sixth flag and displaying a flag of a person mentioning a current user in the fourth session displayed on the first interface, in response to the fourth session receiving an unread message mentioning the current user.

In some embodiments, the second session is a session of a first-category group; and the control unit is further configured to not open the session interface of the second session, and to display a second prompt message, in response to a trigger operation on the second session which is tagged on the first interface, if the current user is not within a group of the second session or the group of the second session has been dissolved; or, The second session is a session of a second-category group; if the current user is not within the group of the second session, then the session interface of the second session is opened in response to a trigger operation on the second session which is tagged on the first interface.

In some embodiments, the opening the session interface where the second message which is tagged is located and positioning to a position where the second message which is tagged is located, in response to a trigger operation on the second message which is tagged on the first interface, includes one or more of:

opening the session interface where the second message which is tagged is located and positioning to a position where the second message which is tagged is originally located, if the second message which is tagged has been recalled;

opening the session interface where the second message which is tagged is located, if the second message which is tagged has been deleted by the current user;

not opening the session interface of the first group and displaying a third prompt message, if the second message which is tagged is a message of the first group and the current user is not within the first group.

In some embodiments, the control unit is further configured to delete the third message from the first interface, in response to the tagged third message being deleted by the current user from the session interface where the third message is located; wherein the current user is a user who has the first interface displayed through a third operation event.

In some embodiments, the control unit is further configured to execute at least one of:

displaying an interface entrance of the first interface in an information flow list;

the control unit is further configured to determine the position of the interface entrance of the first interface in the session list at least according to the time corresponding to the tagged session or message on the first interface.

In some embodiments, a flag of the most recently tagged session or message is displayed at the interface entrance of the first interface.

In some embodiments, the time corresponding to the tagged session is generation time of the latest message in the session, and the time corresponding to the tagged message is time when the message is tagged; or, the time corresponding to the tagged session is time when the session is tagged, and the time corresponding to the tagged message is time when the message is tagged.

In some embodiments, the control unit is further configured to display statistical data at the interface entrance of the first interface, wherein the statistical data includes: at least one of the total amount of tagged messages and tagged sessions, the amount of tagged messages, and the amount of tagged sessions;

In some embodiments, the client interface displays a first window, a second window and a third window that do not overlap with each other; wherein the first window is used for displaying group information; the group information includes information of a plurality of groups, and each group corresponds to an information flow filtered out by using a preset filtering condition of the group; the second window is used for displaying an information flow, and the information flow includes one or both of session and message; the third window is used for displaying an interactive interface corresponding to a currently selected session or message in the second window; the group information of the first window includes tag;

the displaying a first interface, in response to a third operation event for an interface entrance of the first interface, includes: displaying the first interface in the second window, in response to a trigger operation on the tag in the first window.

Because the apparatus embodiment substantially corresponds to the method embodiment, part of the description of the method embodiment may be referred to for relevant information. The above-described apparatus embodiment are only illustrative, and the modules described as separate modules may or may not be separate. Some or all modules may be selected according to actual needs to achieve the purpose of this embodiment. Those ordinarily skilled in the art may understand and implement without any inventive work.

Above, the method and the apparatus according to the present disclosure are illustrated based on the embodiments and the application examples. In addition, the present disclosure further provides an electronic device and a computer-readable storage medium, which will be illustrated below.

Figure 13:
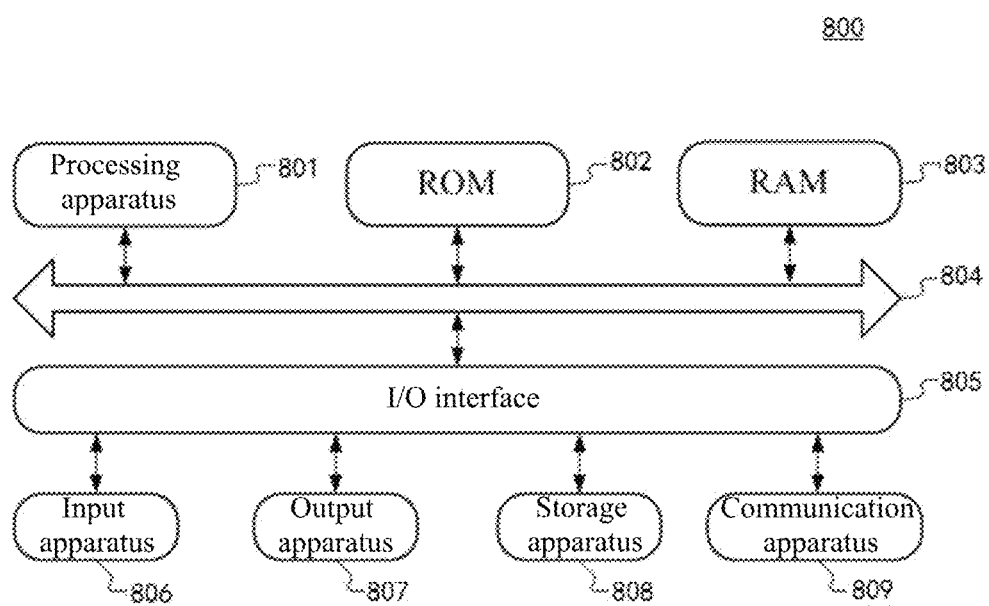
FIG. 13 is a structural schematic diagram of an electronic device according to an embodiment of the present disclosure.

FIG. 13 is specifically referred below, and it shows the structure schematic diagram suitable for achieving the electronic device 800 in the embodiment of the present disclosure. The electronic device 800 in the embodiment of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device shown in FIG. 13 is only an example and should not impose any limitations on the functions and use scopes of the embodiments of the present disclosure.

The electronic device 800 may include a processing apparatus (such as a central processing unit, and a graphics processor) 801, it may execute various appropriate actions and processes according to a program stored in a read-only memory (ROM) 802 or a program loaded from a storage apparatus 808 to a random access memory (RAM) 803. In RAM 803, various programs and data required for operations of the electronic device 800 are also stored. The processing apparatus 801, ROM 802, and RAM 803 are connected to each other by a bus 804. An input/output (I/O) interface 805 is also connected to the bus 804.

Typically, the following apparatuses may be connected to the I/O interface 805: an input apparatus 806 such as a touch screen, a touchpad, a keyboard, a mouse, a camera, a microphone, an accelerometer, and a gyroscope; an output apparatus 807 such as a liquid crystal display (LCD), a loudspeaker, and a vibrator; a storage apparatus 808 such as a magnetic tape, and a hard disk drive; and a communication apparatus 809. The communication apparatus 809 may allow the electronic device 800 to wireless-communicate or wire-communicate with other devices so as to exchange data. Although FIG. 13 shows the electronic device 800 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 809, or installed from the storage apparatus 808, or installed from ROM 802. When the computer program is executed by the processing apparatus 801, the above functions defined in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above-described computer-readable medium may be included in the above-described electronic device; or may also exist separately without being assembled into the electronic device.

The above-described computer-readable medium carries one or more programs; and the above-described one or more programs, when executed by the electronic device, cause the electronic device to execute the above-described method according to the embodiment.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, there is provided an information processing method, including:

tagging a first session, in response to a first operation event for the first session; or, tagging a first message, in response to a second operation event for the first message on a session interface; and displaying a first interface, in response to a third operation event for an interface entrance of the first interface; and displaying the tagged session and the tagged message on the first interface.

According to one or more embodiments of the present disclosure, there is provided an information processing method, wherein the method further includes at least one of:

opening a session interface of a second session which is tagged, in response to a trigger operation on the second session which is tagged on the first interface; and opening a session interface where a second message which is tagged is located and positioning to the second message which is tagged, in response to a trigger operation on the second message which is tagged on the first interface.

According to one or more embodiments of the present disclosure, there is provided an information processing method, further including at least one of:

displaying a first flag in a first state in a session entrance of the first session, after tagging the first session, or displaying the first flag in the first state in the session entrance of the first session and hiding the latest update time;

displaying a second flag in the session interface of the first session after tagging the first session;

changing a display style of the first message on the session interface, after tagging the first message, to distinguish from an untagged message;

displaying a third flag in the first state in an associated position of the first message on the session interface, after tagging the first message;

displaying a first prompt message, if the first session or the first message is not successfully tagged;

changing the first session from an unprocessed state to a processed state, in response to a fourth operation event for the first session, and canceling tag of the first session;

canceling tag of the first session, in response to a trigger operation on a first control associated with the first session;

canceling tag of the first message, in response to a trigger operation on a second control associated with the first message.

According to one or more embodiments of the present disclosure, there is provided an information processing method, further including at least one of:

displaying the first flag in the first state in the session entrance of the first session, after tagging the first session; and canceling display of the first flag and canceling tag of the first session, in response to a trigger operation on the first flag in the first state of the first session;

displaying a third flag in the first state in an associated position of the first message on the session interface, after tagging the first message; and canceling display of the third flag and canceling tag of the first message, in response to a trigger operation on the third flag in the first state of the first message.

According to one or more embodiments of the present disclosure, there is provided an information processing method, further including at least one of:

displaying the first flag in the first state in the session entrance of the first session, after tagging the first session; converting the first flag in the first state to the first flag in the second state, in response to a trigger operation on the first flag in the first state of the first session; keeping display of the first flag in the second state, before moving a control flag away from the session entrance of the first session; and canceling display of the first flag in the second state, after moving the control flag away from the entrance of the first session, wherein if the first flag in the second state in a display state is triggered, the first session is tagged again;

changing the first session from an unprocessed state to a processed state, in response to a fourth operation event on the first session, and canceling tag of the first session; changing the first session to the unprocessed state and keeping the first session in an untagged state, in response to a fifth operation event on the first session, after changing the first session from the unprocessed state to the processed state.

According to one or more embodiments of the present disclosure, there is provided an information processing method, wherein the tagged session and the tagged message are sorted according to time respectively corresponding thereto on the first interface;

time corresponding to the tagged session is generation time of the latest message in the session, and time corresponding to the tagged message is time when the message is tagged; or, the time corresponding to the tagged session is time when the session is tagged, and the time corresponding to the tagged message is time when the message is tagged.

According to one or more embodiments of the present disclosure, there is provided an information processing method, wherein the tagged session and the tagged message displayed on the first interface display a fourth flag, which is associated to the first session and the first message, in the first state;

the method further includes: converting the fourth flag which is triggered to the second state, in response to a trigger operation on the fourth flag in the first state on the first interface; and canceling tag of the session or the message associated with the fourth flag which is triggered.

According to one or more embodiments of the present disclosure, there is provided an information processing method, wherein after the converting the fourth flag which is triggered to the second state, and canceling tag of the session or the message associated with the fourth flag which is triggered, the method further includes:

keeping display of the session or the message associated with the fourth flag which is triggered on the first interface, and keeping display of the fourth flag in the second state, before transferring the control flag to other session or message; and hiding the fourth flag in the second state, after transferring the control flag to other session or message; wherein if the fourth flag in the second state in the display state is triggered, the session or the message associated with the fourth flag which is triggered is tagged again.

According to one or more embodiments of the present disclosure, there is provided an information processing method, further including at least one of:

displaying a fifth flag of a first style at the third session displayed on the first interface, if the third session is not a mute session, and displaying a fifth flag of a second style at the third session displayed on the first interface, if the third session is a mute session, in response to the tagged third session receiving an unread message;

displaying a sixth flag in a fourth session displayed on the first interface, in response to the fourth session tagged as a mute session having no unread message, the sixth flag being used for tagging a mute session; hiding the sixth flag and displaying a flag of a person mentioning a current user in the fourth session displayed on the first interface, in response to the fourth session receiving an unread message mentioning the current user.

According to one or more embodiments of the present disclosure, there is provided an information processing method, wherein the second session is a session of a first-category group; if the current user is not within a group of the second session or the group of the second session has been dissolved, then the session interface of the second session is not opened and a second prompt message is displayed, in response to a trigger operation on the second session which is tagged on the first interface; or, the second session is a session of a second-category group; if the current user is not within the group of the second session, then the session interface of the second session is opened, in response to a trigger operation on the second session which is tagged on the first interface.

According to one or more embodiments of the present disclosure, there is provided an information processing method, wherein the opening the session interface where the second message which is tagged is located and positioning to a position where the second message which is tagged is located, in response to a trigger operation on the second message which is tagged on the first interface, includes one or more of:

opening the session interface where the second message which is tagged is located and positioning to a position where the second message which is tagged is originally located, if the second message which is tagged has been recalled;

opening the session interface where the second message which is tagged is located, if the second message which is tagged has been deleted by the current user;

not opening the session interface of the first group and displaying a third prompt message, if the second message which is tagged is a message of the first group and the current user is not within the first group.

According to one or more embodiments of the present disclosure, there is provided an information processing method, wherein the third message is deleted from the first interface, in response to the tagged third message being deleted by the current user from the session interface where the third message is located; and the current user is a user who opens the first interface through a third operation event.

According to one or more embodiments of the present disclosure, there is provided an information processing method, wherein the method further includes at least one of:

displaying an interface entrance of the first interface in an information flow list; and determining a position of the interface entrance of the first interface in the session list at least according to the time corresponding to the tagged session or message on the first interface.

According to one or more embodiments of the present disclosure, there is provided an information processing method, further including: displaying a flag of the most recently tagged session or message at the interface entrance of the first interface.

According to one or more embodiments of the present disclosure, there is provided an information processing method, wherein time corresponding to the tagged session is generation time of the latest message in the session, and time corresponding to the tagged message is time when the message is tagged; or, the time corresponding to the tagged session is time when the session is tagged, and the time corresponding to the tagged message is time when the message is tagged.

According to one or more embodiments of the present disclosure, there is provided an information processing method, further including:

displaying statistical data at the interface entrance of the first interface, wherein the statistical data includes: at least one of the total amount of tagged messages and tagged sessions, the amount of tagged messages, and the amount of tagged sessions.

According to one or more embodiments of the present disclosure, there is provided an information processing method, wherein the client interface displays a first window, a second window and a third window that do not overlap with each other; the first window is used for displaying group information; the group information includes information of a plurality of groups, and each group corresponds to an information flow filtered out by using a preset filtering condition of the group; the second window is used for displaying an information flow, and the information flow includes one or both of session and message; and the third window is used for displaying an interactive interface corresponding to a currently selected session or message in the second window;

the group information of the first window includes a tag;

the displaying a first interface, in response to a third operation event for an interface entrance of the first interface, includes: displaying the first interface in the second window, in response to a trigger operation on the tag in the first window.

According to one or more embodiments of the present disclosure, there is provided an information processing apparatus, including:

a tagging unit, configured to tag a first session, in response to a first operation event for the first session; or, tag a first message, in response to a second operation event for the first message on a session interface; and a control unit, configured to display a first interface, in response to a third operation event for an interface entrance of the first interface; and display the tagged session and the tagged message on the first interface.

According to one or more embodiments of the present disclosure, there is provided an electronic device, comprising: at least one memory and at least one processor;

wherein the at least one memory is configured to store a program code; and the at least one processor is configured to call the program code stored in the at least one memory to execute the method according to any one of the above-described items.

According to one or more embodiments of the present disclosure, there is provided a computer-readable storage medium, configured to store a program code, wherein the program code, when run by a processor, causes the processor to execute the above-described method.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. An information processing method, comprising:
   tagging a first session, in response to a first operation event for the first session;
   tagging a first message, in response to a second operation event for the first message on a session interface; and
   displaying a first interface, in response to a third operation event for an interface entrance of the first interface, and displaying the session that is tagged and the message that is tagged on the first interface;
   wherein the session that is tagged, and the message that is tagged are displayed in a same first interface.

2. The method according to claim 1, further comprising at least one of:
   opening a session interface of a second session that is tagged, in response to a trigger operation on the second session that is tagged on the first interface; and
   opening a session interface where a second message that is tagged is located and positioning to a position where the second message that is tagged is located, in response to a trigger operation on the second message that is tagged on the first interface.

3. The method according to claim 1, further comprising at least one selected from a group consisting of:
   displaying a first flag in a first state in a session entrance of the first session, after tagging the first session, or displaying the first flag in the first state in the session entrance of the first session and hiding latest update time;
   displaying a second flag in the session interface of the first session after tagging the first session;
   changing a display style of the first message on the session interface, after tagging the first message, to distinguish from an untagged message;
   displaying a third flag in the first state in an associated position of the first message on the session interface, after tagging the first message;
   displaying a first prompt message, in response to the first session or the first message being not successfully tagged;
   changing the first session from an unprocessed state to a processed state, in response to a fourth operation event for the first session, and canceling tag of the first session;
   canceling tag of the first session, in response to a trigger operation on a first control associated with the first session;
   canceling tag of the first message, in response to a trigger operation on a second control associated with the first message.

4. The method according to claim 1, further comprising at least one of:
   displaying a first flag in a first state in a session entrance of the first session, after tagging the first session; and canceling display of the first flag and canceling tag of the first session, in response to a trigger operation on the first flag in the first state of the first session;
   displaying a third flag in the first state in an associated position of the first message on the session interface, after tagging the first message; and canceling display of the third flag and canceling tag of the first message, in response to a trigger operation on the third flag in the first state of the first message.

5. The method according to claim 1, further comprising at least one of:
   displaying a first flag in a first state in a session entrance of the first session, after tagging the first session; converting the first flag in the first state to the first flag in a second state, in response to a trigger operation on the first flag in the first state of the first session; keeping display of the first flag in the second state, before moving a control flag away from the session entrance of the first session; and canceling display of the first flag in the second state, after moving the control flag away from the entrance of the first session, wherein in response to the first flag in the second state in a display state being triggered, the first session is tagged again;
   changing the first session from an unprocessed state to a processed state, in response to a fourth operation event on the first session, and canceling tag of the first session; changing the first session to the unprocessed state and keeping the first session in an untagged state, in response to a fifth operation event on the first session, after changing the first session from the unprocessed state to the processed state.

6. The method according to claim 1, wherein
   the session that is tagged and the message that is tagged are sorted according to time respectively corresponding thereto on the first interface;
   time corresponding to the session that is tagged is generation time of a latest message in the first session, and time corresponding to the first message that is tagged is time when the first message is tagged; or, the time corresponding to first session that is tagged is time when the session is tagged, and the time corresponding to the message that is tagged is time when the first message is tagged.

7. The method according to claim 1, wherein the session that is tagged and the message that is tagged displayed on the first interface display a fourth flag, which is associated to the first session and the first message, in the first state;
the method further comprises: converting the fourth flag that is triggered to the second state, in response to a trigger operation on the fourth flag in the first state on the first interface; and canceling tag of the first session and the first message associated with the fourth flag that is triggered.

8. The method according to claim 7, wherein after the converting the fourth flag that is triggered to the second state, and canceling tag of the first session or the first message associated with the fourth flag that is triggered, the method further comprises:
keeping display of the first session or the first message associated with the fourth flag that is triggered on the first interface, and keeping display of the fourth flag in the second state, before transferring a control flag to other session or message; and hiding the fourth flag in the second state, after transferring the control flag to other session or message; wherein in response to the fourth flag in the second state in a display state being triggered, the first session or the first message associated with the fourth flag that is triggered is tagged again.

9. The method according to claim 1, further comprising at least one of:
in response to a third session that is tagged receiving an unread message, displaying a fifth flag of a first style at a third session displayed on the first interface, in response to the third session being not a mute session, and displaying a fifth flag of a second style at the third session displayed on the first interface, in response to the third session being a mute session;
displaying a sixth flag in a fourth session displayed on the first interface, in response to the fourth session tagged as a mute session having no unread message, wherein the sixth flag is used for tagging a mute session; and hiding the sixth flag and displaying a flag of a person mentioning a current user in the fourth session displayed on the first interface.

10. The method according to claim 2, wherein
the second session is a session of a first-category group; if a current user is not within a group of the second session or the group of the second session has been dissolved, then the session interface of the second session is not opened and a second prompt message is displayed, in response to a trigger operation on the second session that is tagged on the first interface; or,
the second session is a session of a second-category group; if the current user is not within the group of the second session, then the session interface of the second session is opened, in response to a trigger operation on the second session that is tagged on the first interface.

11. The method according to claim 2, wherein the opening a session interface where a second message that is tagged is located and positioning to a position where the second message that is tagged is located, in response to a trigger operation on the second message that is tagged on the first interface, comprises one or more of:
opening the session interface where the second message that is tagged is located and positioning to a position where the second message that is tagged is originally located, in response to the second message that is tagged being recalled;
opening the session interface where the second message that is tagged is located, in response to the second message that is tagged being deleted by a current user;
not opening the session interface of a first group and displaying a third prompt message, in response to the second message that is tagged being a message of the first group and the current user being not within the first group.

12. The method according to claim 1, wherein a third message is deleted from the first interface, in response to a third message that is tagged being deleted by a current user from the session interface where the third message is located; and the current user is a user who opens the first interface through a third operation event.

13. The method according to claim 1, further comprising at least one of:
displaying an interface entrance of the first interface in an information flow list; and
determining a position of the interface entrance of the first interface in the information flow list at least according to time corresponding to the session that is tagged or the message that is tagged on the first interface.

14. The method according to claim 13, further comprising:
displaying a flag of a most recently tagged session or message at the interface entrance of the first interface.

15. The method according to claim 13, wherein the time corresponding to first session that is tagged is generation time of latest message in the first session, and the time corresponding to the message that is tagged is time when the first message is tagged; or, the time corresponding to first session that is tagged is time when the first session is tagged, and the time corresponding to the message that is tagged is time when the first message is tagged.

16. The method according to claim 1, further comprising:
displaying statistical data at the interface entrance of the first interface, wherein the statistical data comprises: at least one selected from a group consisting of a total amount of tagged messages and tagged sessions, an amount of tagged messages, and an amount of tagged sessions.

17. The method according to claim 1, wherein
a client interface displays a first window, a second window and a third window that do not overlap with each other; the first window is used for displaying group information; the group information comprises information of a plurality of groups, each group corresponds to an information flow filtered out by using a preset filtering condition of the group; the second window is used for displaying an information flow, the information flow comprises one or both of a session and a message; and the third window is used for displaying an interactive interface corresponding to a currently selected session or message in the second window;
the group information of the first window comprises a tag;
the displaying a first interface, in response to a third operation event for an interface entrance of the first interface, comprises: displaying the first interface in the second window, in response to a trigger operation on the tag in the first window.

18. An electronic device, comprising:
at least one memory and at least one processor;

wherein the at least one memory is configured to store a program code; and the at least one processor is configured to call the program code stored in the at least one memory to execute an information processing method, which comprises:

tagging a first session, in response to a first operation event for the first session;

tagging a first message, in response to a second operation event for the first message on a session interface; and displaying a first interface, in response to a third operation event for an interface entrance of the first interface; and displaying the session that is tagged and the message that is tagged on the first interface;

wherein the session that is tagged, and the message that is tagged are displayed in a same first interface.

19. The electronic device according to claim 18, wherein the method further comprises at least one of:

opening a session interface of a second session that is tagged, in response to a trigger operation on the second session that is tagged on the first interface;

opening a session interface where a second message that is tagged is located and positioning to a position where the second message that is tagged is located, in response to a trigger operation on the second message that is tagged on the first interface.

20. A non-transient computer-readable storage medium, configured to store a program code, wherein the program code, upon being executed by a processor, causes the processor to execute an information processing method, which comprises:

tagging a first session, in response to a first operation event for the first session;

tagging a first message, in response to a second operation event for the first message on a session interface; and displaying a first interface, in response to a third operation event for an interface entrance of the first interface; and displaying the session that is tagged and the message that is tagged on the first interface;

wherein the session that is tagged, and the message that is tagged are displayed in a same first interface.

\* \* \* \* \*